United States Patent [19]
Du Bois et al.

[11] 3,985,113
[45] Oct. 12, 1976

[54] PRIMER SYSTEM FOR ROTARY COMBUSTION ENGINE

[75] Inventors: Chester G. Du Bois, Zion; Howard M. Pollari, Libertyville, both of Ill.

[73] Assignee: Outboard Marine Corporation, Waukegan, Ill.

[22] Filed: Dec. 18, 1974

[21] Appl. No.: 533,970

[52] U.S. Cl. .......................... 123/187.5 R; 123/8.45
[51] Int. Cl.² .......................................... F02M 1/16
[58] Field of Search ........ 123/187.5 R, 8.45, 179 G, 123/139 AJ, 139 A

[56] References Cited
UNITED STATES PATENTS

| | | | |
|---|---|---|---|
| 2,485,423 | 10/1949 | Weaver | 123/187.5 R |
| 3,342,170 | 9/1967 | McCreary | 123/179 A |
| 3,696,796 | 10/1972 | Gavrum | 123/8.45 |
| 3,795,227 | 3/1974 | Jones | 123/8.45 |
| 3,805,758 | 4/1974 | May | 123/187.5 R |

FOREIGN PATENTS OR APPLICATIONS

| | | | |
|---|---|---|---|
| 438,386 | 3/1912 | France | 123/187.5 R |
| 438,692 | 3/1912 | France | 123/187.5 R |
| 560,198 | 3/1922 | France | 123/187.5 R |

*Primary Examiner*—Wendell E. Burns
*Attorney, Agent, or Firm*—Michael, Best & Friedrich

[57] ABSTRACT

Disclosed herein is a rotary internal combustion engine including a rotor mounted for rotation in a rotor chamber or cavity and having a plurality of apex portions which cooperate with the peripheral wall of the rotor cavity to form a plurality of working or rotating chambers which vary in volume during successive intake, compression, expansion and exhaust phases of the engine cycle, a main fuel inlet communicating with the rotor cavity and communicating successively with each of the rotating chambers to permit intake of fuel for subsequent compression and ignition, a port located to communicate with rotor cavity at an area where a low pressure condition exists during the engine cycle, and a primer valve connected in communication with the port for selectively pumping a quantity of primer fuel directly into the rotor cavity independently of engine operation and thereby facilitating starting of the engine.

7 Claims, 2 Drawing Figures

PRIMER SYSTEM FOR ROTARY COMBUSTION ENGINE

BACKGROUND OF THE INVENTION

This invention relates to the rotary internal combustion engines and, more particularly, to primer systems for rotary internal combustion engines.

Rotary internal combustion engines are sometimes difficult to start when cold or after sitting inoperative for some time.

SUMMARY OF THE INVENTION

In accordance with the invention, starting of rotary internal combustion engines is made easier and quicker by providing means operable independently of engine operation for pumping a quantity of primer fuel directly into the rotor cavity for subsequent compression and ignition.

In a preferred embodiment, the rotary internal combustion engine includes an engine block defining a rotor chamber or cavity, a pressure motivated fuel pump for supplying fuel to the engine under operating conditions, a conduit means connecting the fuel pump in communication with a variable pressure port located in the engine block to communicate successively with the working or rotating chambers, formed by cooperation of the rotor with the cavity, while fuel intake and compression are occurring during periodical pressure variations in the rotating chambers. The fuel pump is actuated by the oscillating pressure condition existing at the pressure port during each engine cycle. Means operable independently of engine operation are provided for selectively pumping a quantity of fuel into the rotor cavity through the pressure port.

In accordance with one embodiment of the invention, a primer valve is connected to a pressure pulse conduit means connecting the fuel pump in pressure communication with the pressure port. In another embodiment, a primer valve is connected in direct communication with the pressure chamber of the fuel pump and the primer fuel flows through the fuel pump pressure chamber en route from the primer valve to the rotor cavity.

In further accordance with the invention, one-way valve means are provided for permitting flow from the primer valve to the rotor cavity and for preventing flow from the rotor cavity to the primer valve.

One of the principal features of the invention is the provision of a fuel primer system for a rotary internal combustion engine to facilitate starting of the engine.

Another of the principal features of the invention is the provision of a rotary internal combustion engine including means operable independently of engine operation for pumping a quantity of primer fuel directly into the rotor cavity.

Still another of the principal features of the invention is the provision of a fuel system for a rotary internal combustion engine requiring minimum modification to existing engine constructions.

Other features and advantages of the invention will become apparent upon reviewing the following detailed description, the drawings, and the appended claims.

Figures 1, 2:
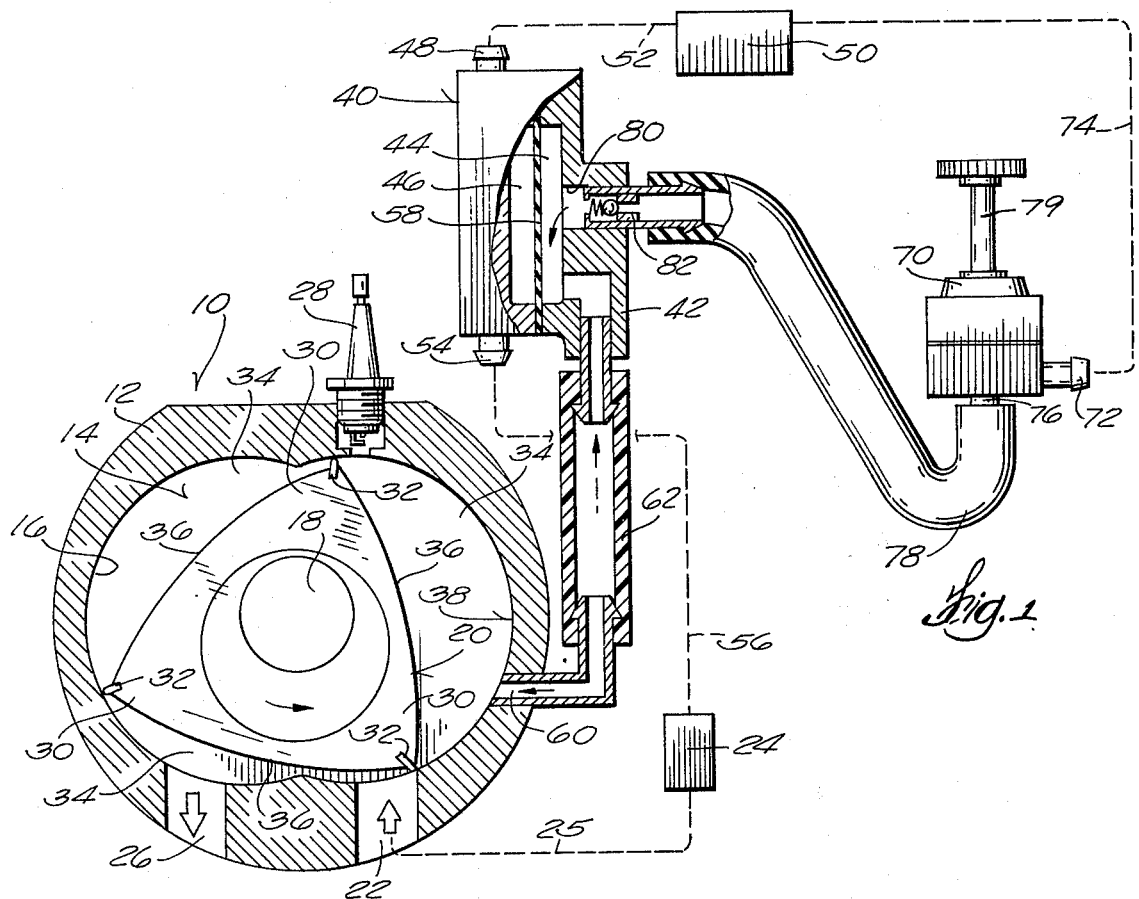
FIG. 1 is a fragmentary and partially diagrammatic view of a rotary internal combustion engine embodying various of the features of the invention.
FIG. 2 is a fragmentary and partially diagrammatic view of another embodiment of a rotary internal combustion engine embodying various of the features of the invention.

Before explaining the invention in detail, it is to be understood that the invention is not limited in its application to the details of construction and the arrangements of the components set forth in the following description or illustrated in the drawings. The invention is capable of other embodiments and of being practiced and carried out in various ways. Also, it is to be understood that the phraseology and terminology employed herein is for the purpose of description and should not be regarded as limiting.

DESCRIPTION OF THE PREFERRED EMBODIMENTS

Illustrated in the drawings is a rotary internal combustion engine 10 including an engine block 12 defining a substantially closed rotor chamber or cavity 14 having an internal peripheral wall 16. Rotatably supported in the engine block 12 is a crankshaft 18 which supports the rotor 12 for rotation relative to the crankshaft 18 within the cavity 14 about an axis located in eccentric relation to the crankshaft axis so as to effect crankshaft rotation in response to cyclical pressure variations in the rotor cavity 14.

The engine block 12 includes a main fuel inlet 22 which communicates with the rotary cavity 14 and through which a mixture of fuel and air is supplied from a carburetor 24 (shown diagrammatically) through a fuel inlet line (illustrated by dashed line 25). Exhaust gases are exhausted from the rotor cavity 14 through an exhaust port 26 in the engine block 12. Mounted on the engine block 12 in communication with the rotor cavity 14 is a spark plug 28 which provides ignition for a compressed, combustible mixture of fuel which, upon expansion, drives the rotor 20 in direction of the arrow.

The rotor 20 has a generally triangular shape and includes a plurality of apex portions 30, each carrying a radially movable sealing member 32. During rotation of the rotor 20, the sealing members 32 are in substantially continuous, gas-sealing engagement with the peripheral wall 16 and three substantially sealed working or rotating chambers 34 are formed between the peripheral faces 36 of the rotor 20 and the peripheral wall 16. The volume and pressure of the rotating chambers 34 vary during rotation of the rotor 20. During each revolution of the rotor 20, an engine cycle having four successive phases: intake, compression, expansion, and exhaust, is completed. All these phases take place in each of the rotating chambers 34 each time the rotor 20 completes one revolution with the volume of the rotating chambers 34 increasing during the intake and expansion phases and the volume decreasing during the compression and exhaust phases.

During a revolution of the rotor 20, a charge of the fuel mixture is drawn into a rotating chamber 34 through the main fuel inlet 22 and this charge is then successively compressed ignited, expanded and finally exhausted through the exhaust port 26. Compression takes place as the rotating chamber 34 rotates from a position of maximum volume, i.e., when a peripheral face 36 of the rotor 20 is opposite to a portion 38 of the peripheral wall 16 extending generally between the main fuel inlet 22 and the spark plug 28 (as shown in FIG. 1) to a position of minimum volume where the rotating chamber 34 is generally opposite to the spark plug 28 (as shown in FIG. 2).

When rotary internal combustion engines are cold or have been inoperative for some time, primer fuel or fuel from the carburetor 24 tends to collect in the intake passageways, rather than dispersing throughout the rotating chambers 34, during initial engine cranking. The sealing members 32 tend to dry out and do not always seal tightly enough against the peripheral wall 16 to create a sufficiently low pressure to cause the fuel to be drawn or "sucked" from the main fuel inlet 22 into the rotating chambers 34 during initial cranking of the engine 10. When these conditions exist, engine starting can be quite difficult.

In accordance with the invention, starting of the engine is facilitated, i.e., made quicker and easier, by providing means operable independently of engine operation for selectively pumping a quantity of primer fuel directly into the rotor cavity 14 at a location where this fuel is subsequently compressed and ignited within a rotating chamber 34.

While various arrangements can be employed, in the specific construction illustrated in FIG. 1, a conventional diaphragm type fuel pump 40 is provided for supplying a positive flow of fuel to the carburetor 24 during engine operation. The fuel pump 40 includes a housing 42 defining a pressure chamber 44 and a fuel chamber 46 having an inlet 48 connected to a fuel tank 50 (shown diagrammatically) by a supply line (illustrated by dashed line 52) and an outlet 54 connected to the carburetor 24 by a feed line (illustrated by dashed line 56). The fuel chamber 46 and the pressure chamber 44 are separated by a resilient member or diaphragm 58 which serves to pump fuel from the fuel tank 50 to the carburetor 24 in response to pressure variations in the pressure chamber 44.

Provided in the engine block 12 is a pressure port 60 which is located at an area of the peripheral wall 16 which is spaced from the main fuel inlet 22 in the direction of rotor rotation and experiences a partial vacuum or low pressure condition during one part of each engine cycle. The pressure port 60 is connected in communication with the pressure chamber 44 of the fuel pump 40 by a pressure pulse conduit 62. During engine operation, the diaphragm 58 is oscillated in response to pressure variations in the rotating chambers 34 communicating with the pressure port 60 and pumps fuel from the fuel tank 50 to the carburetor 24 for subsequent supply to the main fuel inlet 22.

In the embodiment illustrated in FIG. 1, primer fuel is selectively pumped into the rotor cavity 14 through the pressure port 60 by a diaphragm-type primer valve 70 having an inlet 72 connected by a flexible line (illustrated by dashed line 74) to the fuel tank 50 and an outlet 76 connected by a fuel injection line 78 in fluid communication with the pressure chamber 44. The primer valve 70 is actuated, to selectively pump a predetermined quantity of primer fuel under positive pressure, through the fuel pump pressure chamber 44, through the pressure pulse conduit 62, through the pressure port 60, and into the rotor cavity 14, by depressing and releasing a plunger 79 operatively connected to an internal diaphragm (not shown) or by similar means which serves to pump a quantity of fuel from the primer valve 70.

Various conventional primer valves or other suitable means can be used for selectively pumping a quantity of primer fuel under positive pressure into the fuel pump pressure chamber 44. Therefore, a more detailed description of same is not deemed necessary for full understanding of the invention.

Provided in the fuel pump port 80 to permit flow from the primer valve 70 to the fuel pump pressure chamber 44 and to prevent flow from the fuel pump pressure chamber 44 to the primer valve 70 is a suitable one-way valve, such as a ball check valve 82. The fluid pressure produced by the actuation of the primer valve 70 is sufficient to open the check valve 82 and permit fuel flow through the fuel pump pressure chamber 44 and into a rotating chamber 34 when a relatively low pressure exists therein, such as is the case before engine operation is initiated or when the rotor 20 is located at the positions illustrated in FIGS. 1 and 2 during rotation.

In operation, the primer valve 70 is actuated before initiation of or during engine cranking and primer fuel is pumped directly into the rotating chamber 34 communicating therewith and is subsequently compressed and ignited. Thus, the primer fuel is introduced into a rotating chamber 34 under a positive pressure, rather than relying upon a suction which may be inadequate during starting as discussed above, and is uniformly dispersed throughout the rotating chambers so that starting ignition can occur rapidly. During engine operation after starting, the normally closed check valve 82 isolates the fuel pump pressure chamber 44 from the primer valve 70 and the fuel pump 40 operates in the usual manner.

Shown in FIG. 2 is another embodiment in which the fuel injection line 78, instead of being connected to the fuel pump pressure chamber 44, is connected in communication with the pressure pulse conduit 62 at a location between the fuel pump 40 and the pressure port 60. In the specific construction illustrated, there is provided a T-fitting 83 having one leg 84 communicating with the pressure port 60, one leg 86 communicating with the fuel injection line 78, and one leg 88 communicating with the pressure pulse conduit 62. Located at the connection between the leg 86 and the fuel injection line 78 is a suitable one-way valve, such as a ball check valve 90 for permitting flow from the primer valve 70 to the pressure port 60 and for preventing flow from the pressure port 60 to the primer valve 70. During engine operation after starting, the normally closed check valve 90 isolates the pressure pulse conduit 62 from the primer valve 70 so that the fuel pump 40 can operate in the usual manner.

A one-way valve is unnecessary for either of the illustrated embodiments when primer valves having a built-in back flow prevention feature are used.

It can be appreciated that incorporation of the direct injection fuel priming feature provided by the invention requires minimum structural modifications to many existing rotary internal combustion engine constructions, particularly those employing a pressure motivated fuel pump.

While in the preferred construction illustrated, the primer fuel is pumped into a port spaced from the main fuel inlet 22 in the direction of rotor rotation, it is within the scope of the invention to pump the primer fuel directly into the main fuel inlet so long as it is introduced under a positive pressure for uniform dispersion into a rotating chamber 34.

Various of the features of the invention are set forth in the following claims.

What is claimed is:

1. A rotary internal combustion engine comprising an engine block defining a rotor cavity having an internal peripheral wall, a rotor located for rotation in said cavity and including a plurality of apex portions sealingly engaging said peripheral wall, said rotor cooperating with said peripheral wall during rotation of said rotor relative to said peripheral wall to form a plurality of substantially sealed rotating chambers which cyclically vary in volume to alternately undergo fuel intake and expansion when the volume of said chambers is increasing and to alternately undergo compression and exhaust when the volume of said chambers is decreasing, a main fuel inlet communicating with said cavity and communicating successively with each of said chambers to permit intake of fuel for subsequent compression and ignition during engine operation, a port located in said engine block and spaced from said main fuel inlet to communicate successively with said chambers while fuel intake and compression are cyclically occurring in said chambers, a pressure operated fuel pump including a pumping chamber communicating with said inlet and with a source of fuel and a pulsing pressure chamber communicating with said port, and primer means communicating with said port and with a source of fuel and operable for selectively pumping a quantity of primer fuel from the fuel source into said rotor cavity through said port.

2. A rotary internal combustion engine according to claim 1 including one-way valve means in said conduit means for permitting flow from said primer means to said cavity and for preventing flow from said cavity to said primer means.

3. A rotary internal combustion engine according to claim 1 and further including a pressure pulse conduit means connecting said port in communication with said pulsing pressure chamber, fuel injection conduit means connecting said primer means to said pulsing pressure chamber such that fuel flowing from said primer means passes through said pulsing pressure chamber en route to said port, and one-way valve means in said fuel injection conduit means for permitting flow from said primer means to said pulsing pressure chamber and for preventing flow from said pulsing pressure chamber to said primer means.

4. A rotary internal combustion engine according to claim 1 and further including pressure pulse conduit means connecting said port in communication with said pulsing pressure chamber, fuel injection conduit means connecting said primer means in communication with said pressure pulse conduit means at a location between said pulsing pressure chamber and said port, and one-way valve means located in said fuel injection conduit means for permitting flow from said primer means to said pressure pulse conduit means and for preventing flow from said pressure pulse conduit means to said primer means.

5. A rotary internal combustion engine comprising an engine block defining a rotor cavity having an internal peripheral wall, a rotor located for rotation in said cavity and including a plurality of apex portions sealingly engaging said peripheral wall, said rotor, during rotation thereof relative to said peripheral wall, cooperating with said peripheral wall to form a plurality of substantially sealed rotating chambers which cycially vary in volume to alternately undergo fuel intake and expansion when the volume of said chambers is increasing and to alternately undergo compression and exhaust when the volume of said chambers is decreasing, a carburetor connected to a fuel supply, a main fuel inlet communicating with said cavity and communicating successively with each of said chambers to permit intake of fuel from said carburetor for subseqeuent compression and ignition during engine operation, a port located in said engine block and spaced from said main fuel inlet in the direction of rotation of said rotor to communicate successively with said chambers while fuel intake and compression are cyclically occurring in said chambers, a fuel pump connected to said fuel supply for supplying a flow of fuel to said carburetor during engine operation and having a pressure responsive means, pressure pulse conduit means connecting said port in communcation with said fuel pump pressure responsive means whereby said fuel pump responsive means, in response to pressure sensed by said port, acts to pump fuel from said fuel supply to said carburetor, and primer means connected in communication with said pressure pulse conduit means and operable independently of engine operation for selectively pumping a quantity of priming fuel into said chambers through said port.

6. A rotary internal combustion engine according to claim 5 wherein said fuel pump includes a pressure chamber, a fuel chamber, and a resilient member separating said pressure chamber and said fuel chamber, and said pressure pulse conduit means connects said port in communication with said fuel pump pressure chamber, fuel injection conduit means connecting said primer means to said fuel pump pressure chamber such that fuel flowing from said primer means passes through said fuel pump pressure chamber en route to said port, and one-way valve means in said fuel injection conduit means for permitting flow from said primer means to said fuel pump pressure chamber and for preventing flow from said fuel pump pressure chamber to said primer means.

7. A rotary internal combustion engine according to claim 5 wherein said fuel pump includes a pressure chamber, a fuel chamber, and a resilient member separating said pressure chamber from said fuel chamber, and said pressure pulse conduit means connects said port in communication with said fuel pump pressure chamber, fuel injection conduit means connecting said primer means in communication with said pressure pulse conduit means at a location between said fuel pump pressure chamber and said port, and one-way valve means located in said fuel injection conduit means for permitting flow from primer means to said pressure pulse conduit means and for preventing flow from said pressure pulse means to said primer means.

* * * * *

UNITED STATES PATENT AND TRADEMARK OFFICE
CERTIFICATE OF CORRECTION

PATENT NO. : 3,985,113
DATED : October 12, 1976
INVENTOR(S) : Chester G. DuBois, et al.

It is certified that error appears in the above-identified patent and that said Letters Patent are hereby corrected as shown below:

Column 1, line 62, after "fuel", insert -- primer --.

Signed and Sealed this

Fifth Day of June 1984

[SEAL]

Attest:

GERALD J. MOSSINGHOFF

*Attesting Officer*     *Commissioner of Patents and Trademarks*